(No Model.)
W. A. PITT.
MECHANICAL MOVEMENT.
No. 386,027. Patented July 10, 1888.
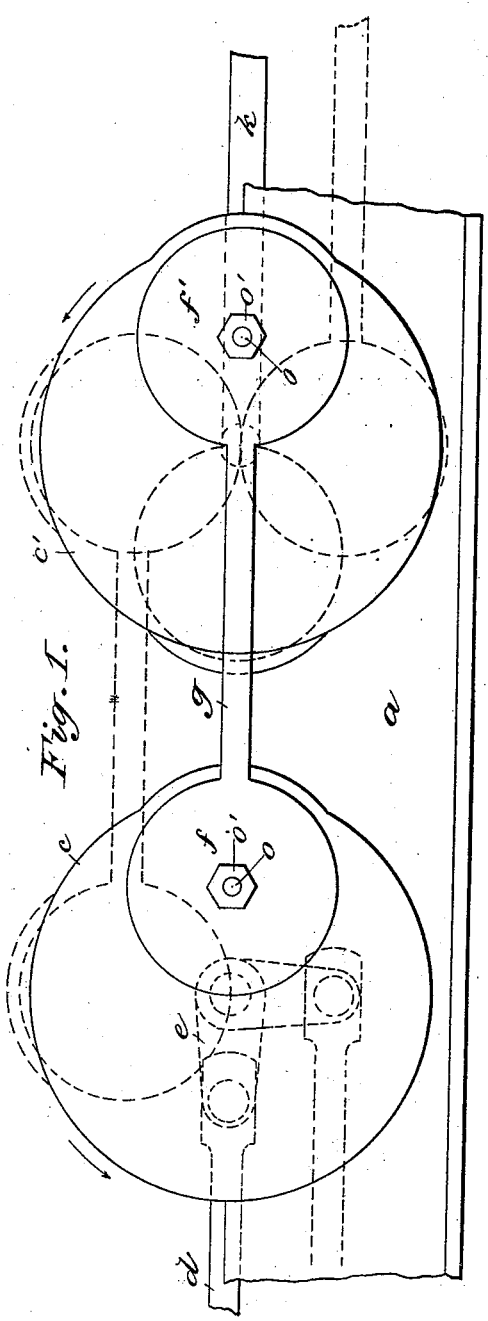
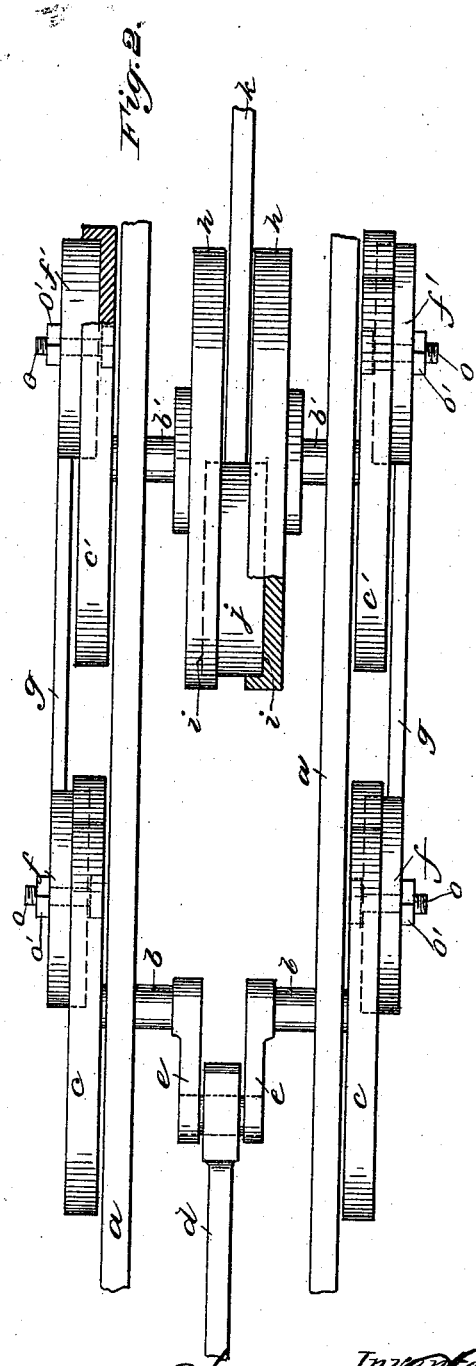

UNITED STATES PATENT OFFICE.

WILLIAM A. PITT, OF GLENBROOK, CONNECTICUT.

MECHANICAL MOVEMENT.

SPECIFICATION forming part of Letters Patent No. 386,027, dated July 10, 1888.

Application filed July 20, 1886. Serial No. 208,529. (No model.)

*To all whom it may concern:*

Be it known that I, WILLIAM A. PITT, a citizen of the United States, residing at Glenbrook, in the county of Fairfield and State of Connecticut, have invented an Improved Mechanical Movement, of which the following is a specification.

My invention relates to a means for producing an increase of power, in transmission, in any power-machine, from the power end to the weight end, or from the commencement of the stroke of the piston to the end or finish of the same; and my improved mechanism consists in the combination and arrangement of large fly-wheels and rods whose connections with said wheels travel from the periphery of said wheels to the dead-center, and from the dead-center to the periphery, or with a like motion between any two points between the periphery and dead-center, whereby I am enabled by expending a certain initiative force to establish a minimum of power and increase such power as the distance in common leverage or the square or cube of such distance, and so on. This mechanism is especially adapted for air-compressing machines, vacuum-pumps, and all other machines where an inverse ratio of power is required or takes place.

In the accompanying drawings, which serve to illustrate my invention, Figure 1 is a side elevation of the mechanism I employ to accomplish this result, and Fig. 2 is a top plan view of the same.

$a$ represents the bed or frame within which the operating parts are mounted. $b\,b$ and $b'\,b'$ are respectively cross-shafts, which carry on their projecting ends the fly-wheels $c\,c$ and $c'\,c'$, the said fly-wheels being connected together in such a manner and to another set of fly-wheels that the connecting device is made to travel within said wheels to and from their periphery on the rotation of the wheels.

$g$ and $g'$ are rods which connect together the fly-wheels $c$ and $c'$. These rods are made with flat or disk-shaped ends, as at $f\,f$ and $f'\,f'$, having an inner projecting portion fitting into a correspondingly-shaped recess formed in the outer face of the fly-wheels $c\,c$ and $c'\,c'$, being held therein by means of the bolts $o$ and nuts $o'$, which pass through the same. On the inner end of each of the shafts $b'\,b'$, that carry the fly wheels $c'\,c'$, is mounted another fly-wheel, $h$, the two faces of these wheels lying close to each other and both being provided with an annular recess, $i$, similar to the other fly-wheels, into which is also fitted the two projecting portions or opposite faces of the disk-shaped extremity of another rod, $k$, which serves to connect these two wheels together.

In operation the fly-wheels $c\,c$ and $c'\,c'$ receive motion through the piston-rod $d$ and crank $e$, and in their revolution operate the connecting-rods $g$ and $g$, causing the disk-shaped ends to be moved around the common centers of the respective fly-wheels, which movement, through the shafts $b'$ and $b'$, is communicated to the fly-wheels $h\,h$ and connecting-rods $k$; the dotted lines in Fig. 1 showing the position the disk ends assume when the fly-wheels have made a quarter-revolution on a half-stroke of the piston-rod.

This mechanical movement is particularly applicable to all machines for compressing air, gases, vapors, &c.

What I claim as new, and desire to secure by Letters Patent, is—

1. In a mechanical movement, revolving shafts and fly-wheels having connecting-rods, each provided with disk-shaped ends fitted into recesses in said fly-wheels, in combination with intermediate fly-wheels, and a rod having a disk-shaped end seated in the opposite faces of said wheels, as and for the purpose set forth.

2. In a mechanical movement, the combination of the shafts $b$ and $b'$, fly-wheels $c\,c'$, each provided with a recess, rods $g\,g$, having disk shaped ends fitted in said recesses, bolts $o$, nuts $o'$, and fly-wheels $h\,h$, with rod $k$, having disk-shaped ends $j$, all arranged and operating as set forth.

WILLIAM A. PITT.

Witnesses:
 HERMAN S. LOEW,
 K. NEWELL.